Patented Nov. 23, 1948

2,454,730

UNITED STATES PATENT OFFICE 2,454,730

PROCESS FOR REFINING KERATIN-CONTAINING MATERIAL

Stefan Bakonyi, Tovaros, Hungary; vested in the Attorney General of the United States No Drawing. Application August 26, 1939, Serial No. 292,158. In Germany August 26, 1938

5 Claims. (Cl. 260—112)

The invention relates to the manufacture of moulding powders, and is particularly concerned with the preparation of keratin-containing material in a form suitable for incorporation with a urea and/or thiourea formaldehyde condensation product, so as to produce moulding powders which yield moulded products having desirable properties of pale colour, clarity, resistance to water and to light, good machining properties, horn-like physical properties and freedom from moulding defects. The moulding powders flow well and are rapid-hardening. The process according to one feature of the invention is one in which keratin-containing material is refined to render it suitable for incorporation with a condensation product from urea and/or thiourea and formaldehyde into a moulding powder, by subjecting cleaned comminuted keratin-containing material to treatment firstly with an oxidising agent and then with a reducing agent.

The raw material may be hoofs, claws, horns, hairs, feathers and the like. The preferred material is hoofs, since these are purer, more elastic and less encrusted and give clearer and better keratin.

The raw material containing keratin is cleaned and ground to a granular meal. The meal is then digested with dilute acid, to which zinc chloride may be added, whereby iron, lime and other acid soluble impurities are removed. After washing with water the acid-free meal is treated by a mild oxidising agent which may be a 0.5–2% solution of slightly alkaline hydrogen peroxide. By the oxidation the material becomes paler, clearer and more plastic. After the treatment with the oxidising agent the material is washed with water and freed from reducible impurities by treatment with a mild reducing agent which may be a 0.5–1% solution of hydrosulphite or of another diluted reducing agent. The reducing treatment makes the material still paler, clearer, more plastic and more resistant against oxidation. The reduction treatment also removes the traces of the oxidising agent which, if not removed, would cause the material to darken during the hot moulding. After removing the reducing solution the material is washed with water and treated with a very dilute (0.1–1%) acid which may contain zinc chloride. Finally the material is dried at 45 to 65° C. and ground to a fine flour which is a very clean keratin. Neither oxidising alone, nor reducing alone, nor firstly reducing and then oxidising produce a very clean keratin equivalent to the product of the process described above. It is necessary firstly to oxidise and then to reduce, as above described.

The refined keratin flour is mixed with condensation products from urea and/or thiourea and formaldehyde, if necessary or desired with addition of condensation product from phenol and/or cresol and formaldehyde and of other synthetic resins, dried and ground. According to one feature of the invention a condensation product containing excess formaldehyde is first made and, in a later stage of the preparation, an amount of urea and/or thiourea sufficient for this excess is added. Furthermore, an acid catalyst is added, which acts as a condensation agent for the excess formaldehyde and as an accelerator for the curing of the moulding powder. The acid catalyst may be added to the dried product before grinding. As acid catalysts the preferred compounds are high molecular polybasic organic acid anhydrides, acids or acid esters which are sparingly soluble in the condensation mixture and act as condensing agents only at the high temperature used for pressing when they dissolve in the molten mass and bring about rapid hardening. Examples are phthalic anhydride, adipic, sebacic and succinic, phthalic and resinic acids, or their acid esters. An organic amine may be added to the condensation mixture to improve the wetting properties. As an accelerator of the condensation and as a buffering agent ammonia may be added to the condensation mixture. The condensation mixture is mixed with the refined keratin flour, dried and finely ground. By hot moulding this powder melts to a homogeneous mass and gives nearly clear mouldings.

For improvement of the water resistance and chemical resistance the condensation mixture may as stated above be mixed with phenol and/or cresol and formaldehyde condensation products or with other synthetic resins containing formaldehyde. The phenol and other resins also form with the other components homogeneous products since the urea resin acts as a mutual solvent for the keratin and the phenolic resin. It is not possible to form a homogeneous mass from phenolic resin and keratin without urea resin.

The mouldings made according to the invention are pale, water and light resistant and easily moulded, but they are not so brittle as the majority of commercial aminoplastics; they can be easily turned, drilled and tapped and worked by all methods as casein plastics, natural horn, ivory and cast resins. Whilst the majority of commercial aminoplastics are brittle and accordingly are generally used in connection with cellulose fillers which have the disadvantage of rendering them opaque, the mouldings according to the present invention are almost clear.

The invention is illustrated by the following examples.

*Example 1*

I. 200 kg. of cleaned hoofs are broken down into pieces of 5–20 mm. diameter, dried at 45–65° C. and ground to a granular meal. Soft hoofs, such as those from calves, sheep or swine may be planed into chips. The meal or the chips are treated with 800 litres of 1–2% iron-free HCl at 30–36° C. for 12–24 hours with occasional or continuous stirring 0.4–0.6 kg. $ZnCl_2$ may be added to the acid solution. After the treatment the material is freed from the acid solution in a centrifuge and washed with water until the wet meal shows a pH=6. Next the material is placed in a 1% weakly alkaline solution of hydrogen peroxide and again allowed to stand for 12–48 hours or longer at 30–36° C. with stirring. The reaction of the bath is maintained weakly alkaline throughout. For greater economy the hydrogen peroxide may be added to the bath in several portions. At the end of the treatment the liquor is separated from the solid in a centrifuge and the latter is washed with water until no reaction is observed with starch iodide paper. The material is then treated with 800 litres of 0.8–1% $Na_2S_2O_4$ solution and stirred occasionally for 12–24 hours at 30–36° C. The material is separated from the bath and washed with a 0.1–1% solution of acid, i. e. formic acid and finally washed with water until the wet meal shows a pH=6. It is then dried at 45–65° C. and ground to a fine flour (2500 meshes to a square cm.) The yield is about 180 kg. The separated liquors are filtered, brought up to strength and used again, so long as they do not become too dirty.

II. 100 kg. urea (or a mixture of 85.7 kg. urea and 18.1 kg. thiourea) are dissolved in such a portion of commercial formalin (40% per volume or 30% by weight) as contains 100 kg. of gaseous formaldehyde and neutralised with 3–4 litres of 25% ammonia solution. Now 0.25 kg. ethylene diamine are added and the reaction mixture is allowed to stand for 18–24 hours at about 20° C. At higher temperatures this time becomes shortened.

III. The condensation mixture prepared as in II may be mixed with 14.3 kg. urea (or 18.1 kg. thiourea) so that the molecular proportion of urea (thiourea) to formaldehyde is brought to 1:1.75. Then 0.45 to 0.85 kg. of phthalic anhydride or an equivalent amount of phthalic monoglyceride or the equivalent quantity of adipic acid or of adipic monoglyceride is added in alcoholic solution. After mixing well the reaction mixture becomes a syrup.

IV. The condensation mixture made according to II or to II and III is mixed with the refined keratin flour prepared as in I and kneaded well for 1 to 2 hours in a stainless mixing machine. The cream-like mass is extruded in thin rods from a stainless extruding machine, and these rods are then dried either in a stream of air or in vacuum at about 50° C. for 4 to 8 hours. The dry product is then finely ground.

The moulding powder manufactured in this way is moulded at 140–145° C. under a pressure of 180–500 kg. per sq. cm. with a curing time of ¼ to ¾ minute per mm. thickness. Very pale, nearly clear, brilliant, water and light resistant and mechanically strong mouldings are made, which can be worked by turning, drilling, etc. The material can be coloured by known methods and made to produce mottled effects similar to buffalo horn, tortoise-shell and the like. The material flows so well that not only buttons, but also large and complicated mouldings can easily be made, for example boxes, frames, vases, cameras, radio cases, lamp shades, household fittings, typewriters, automobile accessories, fancy goods and the like. The mouldings can afterwards be worked by mechanical processes and this is in many cases necessary. If the operation III of Example 1 is omitted, the excess formaldehyde is partially lost but the clarity of the mouldings is increased.

*Example 2*

Working according to Example 1 the condensation mixture under II or under II and III is mixed with 33 kg. of phenol and/or cresol formaldehyde condensation products and 2.7 kg. hexamethylentetramine. The amount of the refined keratin flour is increased to 200 kg. The moulding powder made in this way is still more resistant to water but less resistant to light and gives mouldings suitable for chemical and electrical industries.

*Example 3*

Working according to Example 1, the amount of refined keratin flour is increased to 495 kg. and sufficient water added to make the dough easy to mix. There results a moulding powder which is similar to that made in accordance with Example 1, but which flows less under the press and is less resistant to water. This moulding powder is suitable for cheap articles, since the cheapness of the keratin raw material makes the manufacture cheaper than that of other moulding powders containing great quantities of artificial resins.

The proportion of keratin flour to urea resin or phenol (cresol) resin can also be different from the above proportions, e. g. from about 3:1 to about 1:3. Raising the keratin content, lowers the water resistance and the flow. Lowering the keratin content under 1:1 slightly reduces the ease of machining. The sensitivity to water of mouldings rich in keratin can be reduced by immersion in formalin.

*Example 4*

Working as in Example 1, the hoofs are replaced by horns. The flow of the moulding powder and the clarity of the mouldings is lower but the mechanical strength is very good. By using feathers instead of hoofs, very good flow and clarity is obtained. Analogous results are obtained with hairs.

What I claim is:

1. Process for refining keratin-containing material to render it more suitable for incorporation with a condensation product from formaldehyde and a substance selected from the group consisting of urea and thiourea into a moulding powder, which process comprises refining cleaned comminuted keratin-containing material by treatment firstly with mild hydrogen peroxide solution and then with a mild hydrosulphite solution.

2. Process as claimed in claim 1, in which the keratin-containing material is treated before oxidising with a weak acid.

3. Process as claimed in claim 1, in which the keratin-containing material is treated after reducing with a weak acid.

4. Process for refining hoofs to render the material more suitable for incorporation with a condensation product comprising formaldehyde and a substance selected from the group consisting of urea and thiourea into a moulding powder, which process comprises refining cleaned comminuted hoofs by treatment firstly with a slightly alkaline solution of hydrogen peroxide of 0.5–2% strength and then with a solution of a hydrosulphite of 0.5–1% strength.

5. The process for obtaining from hoofs, and hides, keratin suitable for incorporation with a condensation product of formaldehyde and a substance selected from the group consisting of urea and thiourea for making a moulding powder, which comprises after treating the comminuted keratin-containing material with diluted iron free hydrochloric acid to which has been added zinc chloride and washing, then treating firstly with a weakly alkaline hydrogen peroxidizing agent and then with a mild hydrosulphite solution and washing with formic acid.

STEFAN BAKONYI.

REFERENCES CITED

The following references are of record in the file of this patent:

UNITED STATES PATENTS

| Number | Name | Date |
|---|---|---|
| 128,000 | Wells | June 18, 1872 |
| 1,114,981 | Goldsmith | Oct. 27, 1914 |
| 1,289,053 | Mumford | Dec. 24, 1918 |
| 1,756,252 | Lougovoy | Apr. 29, 1930 |
| 2,004,970 | Armenault | June 18, 1935 |
| 2,125,776 | Ellis | Aug. 2, 1938 |
| 2,159,981 | Bakonyi | May 30, 1939 |

OTHER REFERENCES

Chem. Abstracts, vol. 32, 1938, col. 2361, article by M. Barr.